Jan. 15, 1963 — L. R. LAZO ETAL — 3,073,512
TURBOCHARGER FENCE RING
Original Filed June 16, 1958 — 2 Sheets-Sheet 1

INVENTORS
Luis R. Lazo
BY Benjamin Barish
ATTORNEYS

Jan. 15, 1963  L. R. LAZO ETAL  3,073,512
TURBOCHARGER FENCE RING
Original Filed June 16, 1958  2 Sheets-Sheet 2

INVENTORS
Luis R. Lazo
BY Benjamin Barish

ATTORNEYS

United States Patent Office 3,073,512
Patented Jan. 15, 1963

3,073,512
TURBOCHARGER FENCE RING
Luis R. Lazo, Mentor, and Benjamin Barish, Lyndhurst, Ohio, assignors to Thompson Ramo Wooldridge Inc., a corporation of Ohio
Original application June 16, 1958, Ser. No. 742,071, now Patent No. 3,010,697, dated Nov. 28, 1961. Divided and this application Nov. 28, 1960, Ser. No. 72,068
2 Claims. (Cl. 230—133)

The present invention relates to improvements in compressors and particularly to an improved compressor structure wherein internal boundary layer flow back which interferes with the proper flow of compressed fluid is prevented.

The present application is a division of our copending application entitled "Turbocharger," U.S. Serial No. 742,-071, filed June 16, 1958, now Patent No. 3,010,697 granted November 28, 1961.

A feature of the present invention is the provision of an assembly which enables forming the housing in a simplified structure having a boundary layer flow back preventing fence, formed of an inexpensive and simplified fabricated structure. The fence is spiral shaped and projects outwardly along one side of the radial throat of the compressor and projects into an involute shaped discharge chamber of the compressor to prevent flow back across the throat.

An object of the invention is to provide an improved compressor construction for preventing a boundary layer flow back in the compressed air receiving scroll.

Another object of the invention is to provide a simplified compressor housing construction with a boundary layer flow back preventing fence formed of a stamped flat metal plate attached within the housing.

Other objects and advantages will become more apparent with the teachings of the principles of the present invention in the descriptions and illustrations of the specification, claims and drawings, in which:

As shown on the drawings.

The figures of the drawings illustrate a compressor embodied as part of a turbocharger as a preferred environment for the compressor. It will of course be understood that the compressor and its features may be employed in other environments.

Figure 1:
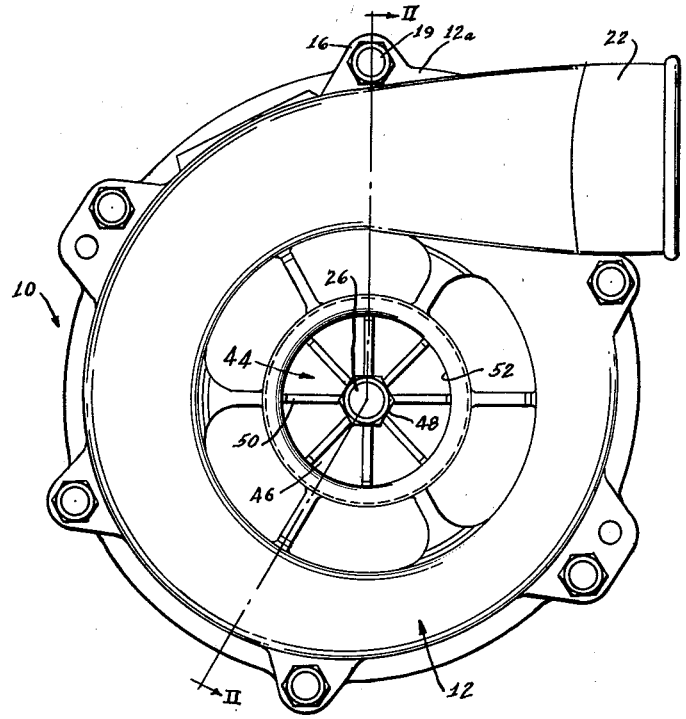
FIGURE 1 is a side elevational view of a compressor embodying the principles of the present invention.
Figure 3:
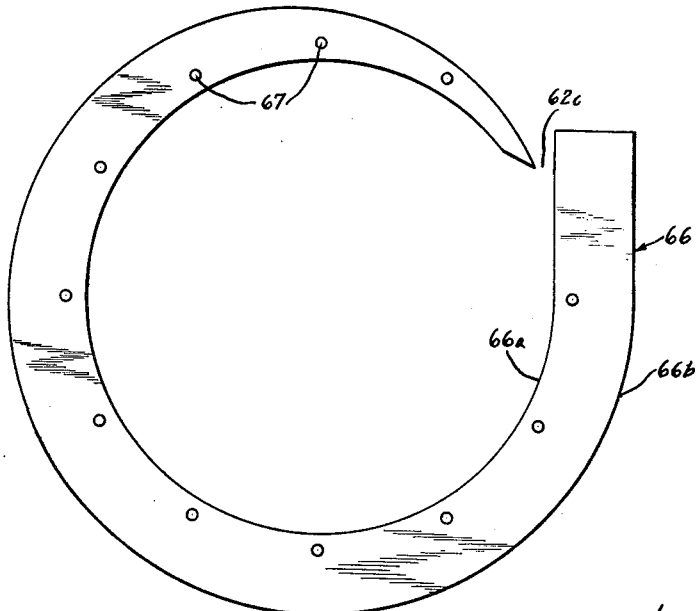
FIGURE 3 is a detailed elevational view of the fence for preventing boundary layer flow back in the compressor discharge chamber.

FIGURE 1 illustrates a turbocharger 10 embodying the features of the invention. The turbocharger is enclosed in a housing 12. At the compressor end, the housing 12 has a housing part 12a secured to a part 12b which in turn is secured to another part 12c at the turbine end. Parts 12a and 12b are formed with annular meeting faces and a gasket 14 is located between the faces to seal the parts. Bosses, such as 16 and 18, may project from the housing parts to receive bolts 19 for securing the parts 12a and 12b together.

The housing parts 12b and 12c are provided with flanges 12d and 12e which are utilized for clamping the housing parts 12b and 12c together by an annular clamping band 20. The band is provided with inclined inner faces which mate with the inclined outer faces of the flanges 12d and 12e to securely clamp the parts together, and the band 20 may be loosened for relatively rotationally shifting the parts 12c and 12b to change the relative positions of the compressor end and turbine end of the turbocharger. This variation in rotational position between the ends can be illustrated by reference to FIGURES 1 and 2. In FIGURE 1, the housing part 12a is provided with a compressed air discharge outlet fitting 22, and the housing part 12c is provided with a large inlet boss 24 for hot gases. The conduits to which these fittings connect and their positions can be better accommodated with relative rotational shifting of the parts 12a and 12c.

Extending axially through the housing is a shaft 26 supported in bearing means 28 with seals 30 and 32 along the shaft to prevent the escape of lubricant and to prevent the pressurized air and hot operating gases from entering the lubricant compartments. Lubricating oil is fed downwardly through a passage 33 in the housing part 12b and feeds to lubricating branches 34 and 36, which supply openings in the bearings. The lubricant flows from the bearings down to a lubricant drain compartment 38, and through a lubricant drain opening 40.

At one end of the housing 12 the parts 12a and 12b form a compressor rotor chamber 42 in which rotates a vaned compressor rotor 44. The compressor rotor has a hub 46 mounted on the shaft 26 and held thereon by a threaded nut 48. The compressor rotor is provided with impeller vanes 50 which force the air centrifugally outwardly to compress it in a known manner. Air is taken in through an air inlet opening 52 formed by an annular hub 54 on the housing part 12a. The housing part 12b has a radial flat face 56 extending outwardly from the rotor and with an opposing inwardly facing surface 58 on the housing part 12a forms an air flow throat 60 extending radially outwardly for the flow of air from the vanes 50 of the compressor rotor 44. The air passes outwardly from the throat 40 into an involute scroll air chamber 62. As the compressor rotor 44 forces the compressed air outwardly through the throat 60, it enters the chamber 62 and is discharged out through the fitting 22. The air flowing outwardly along the flat wall 56 tends to circle in the chamber 62 and flow inwardly along the inner surface 64 to interfere with the flow all through the throat 60. This effect may be referred to as back wash or as boundary layer flow back.

A fence 66 in the form of an annular ring is secured to the wall 58 beside the throat and projects radially outwardly into the chamber 62. The plate or fence ring 66, shown in detail in FIGURE 6, is somewhat spiral in shape having a generally spiral inner edge and a generally spiral outer edge to follow the contour of the involute chamber 62. The ring is interrupted at 62c to follow the shape of the chamber 62. The fence ring is provided with circumferentiatlly spaced holes 67 through which are inserted screws 68 threaded into threaded holes 70 in the housing part 12a to secure the fence ring 66 in place. The fence ring may also be fastened by welding or suitable bonding. With the construction shown, the ring may be simply manufactured by stamping or cutting from flat surfaced sheet metal plates.

If the housing part 12a were made by casting with a fence formed by curving the casting material outwardly, this would create numerous coring and molding problems complicated by shrinkage and cracking. We have found that it is unnecessary to exercise the care which would be required in forming a smooth cast in fence. With the provision of a simply manufactured, inexpensive casting for parts 12a and 12b and an inexpensive stamped ring, a coacting assembly is obtained preventing boundary layer flow back.

The shaft 26 is driven by a turbine rotor 72 mounted at the other end of the shaft. The turbine rotor has a hub 74 suitably secured on the shaft with shaped outwardly extending vanes 76. The turbine rotor vanes 76 face outwardly toward a slot or throat 78 through which the heated operating gases flow to drive the rotor. The gases are discharged through an exhaust passage 80, formed in an annular hub 82 which is part of the housing part 12c. The operating gases are supplied to the throat through a scroll or operating gas chamber 84 which extends annularly around the throat 78 which supplies the rotor chamber 86.

Figure 2:
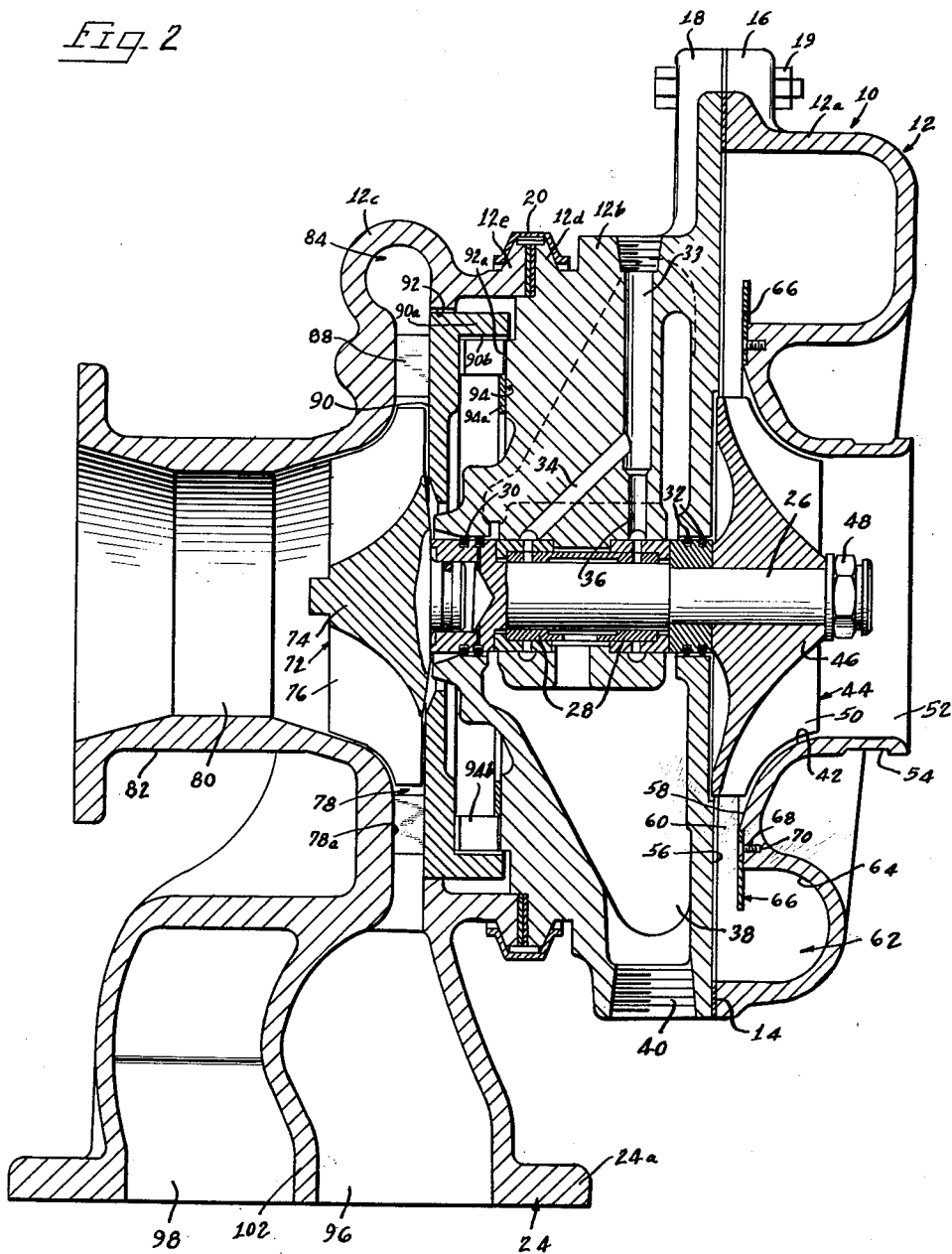
FIGURE 2 is a vertical sectional view taken substantially along line II—II of FIGURE 1, and illustrating details of the interior of the compressor, shown as forming a part of a turbocharger.

Within the throat 78 are stator or nozzle vanes 88 secured to a nozzle vane plate or ring 90. As illustrated in FIGURE 2, beside the throat 78 and extending axially therefrom is an annular recess 92 in which the vane ring is located. The annular recess also provides a location for a spring ring 94. The spring ring is backed against the wall 92a, and urges the vane ring and vanes 88 against the side 78a of the throat 78. The vane ring has an annular flange 90a with an inner surface 90b that centers the spring ring 94.

Thus, the housing part 12c can be inexpensively made, and the vane ring 90 and vanes 88 are substantially independent of the housing in contraction and expansion with temperature change. This greatly reduces the cost of manufacture and improves the safety and operational performance, avoiding expensive mountings for vanes and the cost of constructions of the type heretofore used.

The spring ring 94, as shown in FIGURE 2, may take various forms, as will be appreciated by those skilled in the art, but is especially advantageous in being formed with a ring shaped annular back 94a from which facing tongues such as 94b are cut to resiliently project outwardly and engage the vane ring 90. This forms an inexpensive, easily assembled spring arrangement, and the vane assembly and spring assembly comprise only two parts.

A divided hot gas inlet is provided for improved operation and for the receipt of operating gas from dual banks of cylinders when the turbocharger is used in an engine having cylinders arranged in banks. The divided inlet is illustrated as preferably formed integrally within the housing part 12c, and is illustrated in FIGURE 1. The inlet connector 24 has an outwardly extending flange 24a for connecting a gas supply conduit which is of a size to supply the passage 96 and the passage 98, and has dual passages.

Operating gas distribution is obtained by the annular extending chamber 84 which is divided into two parts. At the upper end, the chamber is divided by a generally radially extending wall not shown, which is twisted for directing the flow of operating gases in their radially inward direction toward the nozzle vanes 88, and for preventing cracking with expansion and contraction. The radial twisted wall divides the chamber 84 into a first part and a second part. The inlet passage 96 supplies the first part, and the passage 98 supplies the second part. The passages 96 and 98 are separated by a twisted wall 102 which is substantially diametrically opposite the radial twisted wall. Wall 102, being twisted, also resists cracking with heat expansion and contraction.

In operation of the compressor, the rotor 44 is driven by the turbine and air flows in through the inlet 52 and is forced radially outwardly through the throat 60 and into the involute compressor chamber 62. Boundary layer flow back of air is prevented by the spiral fence ring 66 and the compressed air is discharged through the fitting 22.

Thus it will be seen that we have provided an improved compressor structure which meets the objectives, advantages and features hereinbefore set forth. An improved compressor is provided with improved flow characteristics and the compressor is inexpensively made without complications in casting, and the parts are easily assembled.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A compressor comprising in combination a cast housing defining a compressor rotor chamber therein with an annular radially extending throat opening outwardly from the rotor chamber and with a discharge chamber opening radially and axially outwardly of said throat, a flat surfaced sheet metal spirally shaped fence ring enlarging in a radial dimension from a small end to a large end and positioned to extend radially outwardly from said throat into said discharge chamber, a radial flat surface on one side of said housing within said throat, and means securing said fence ring against said housing surface with one side surface of the ring in engagement with the housing surface and the other surface forming one side of the throat.

2. A flow back preventing fence for rigidly mounting at one side of a throat of a compressor having a rotor for delivering air outwardly through a radial throat to an involute chamber with an air flow outlet, the fence comprising a stamped flat spiral shaped metal ring tapering to a narrow portion at one end and widening to a broad portion at the other end with a spirally shaped inner edge and a spirally shaped outer edge to be secured against the housing of a compressor at one side of the throat and to project outwardly into the involute chamber of the housing.

References Cited in the file of this patent

UNITED STATES PATENTS

| | | |
|---|---|---|
| 2,178,405 | Reggio | Oct. 31, 1939 |
| 2,285,976 | Huitson | June 9, 1942 |
| 2,577,179 | Buchi | Dec. 4, 1951 |
| 2,777,632 | Kishline et al. | Jan. 15, 1957 |
| 2,819,837 | Loeb | Jan. 14, 1958 |